Aug. 4, 1931.  J. W. OUTTERSIDE  1,817,705
ATTACHMENT FOR AUTO FENDERS
Filed Aug. 23, 1929
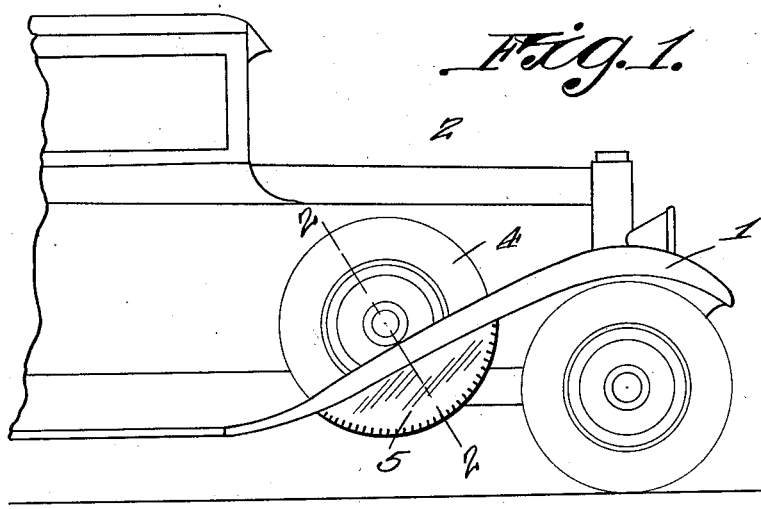
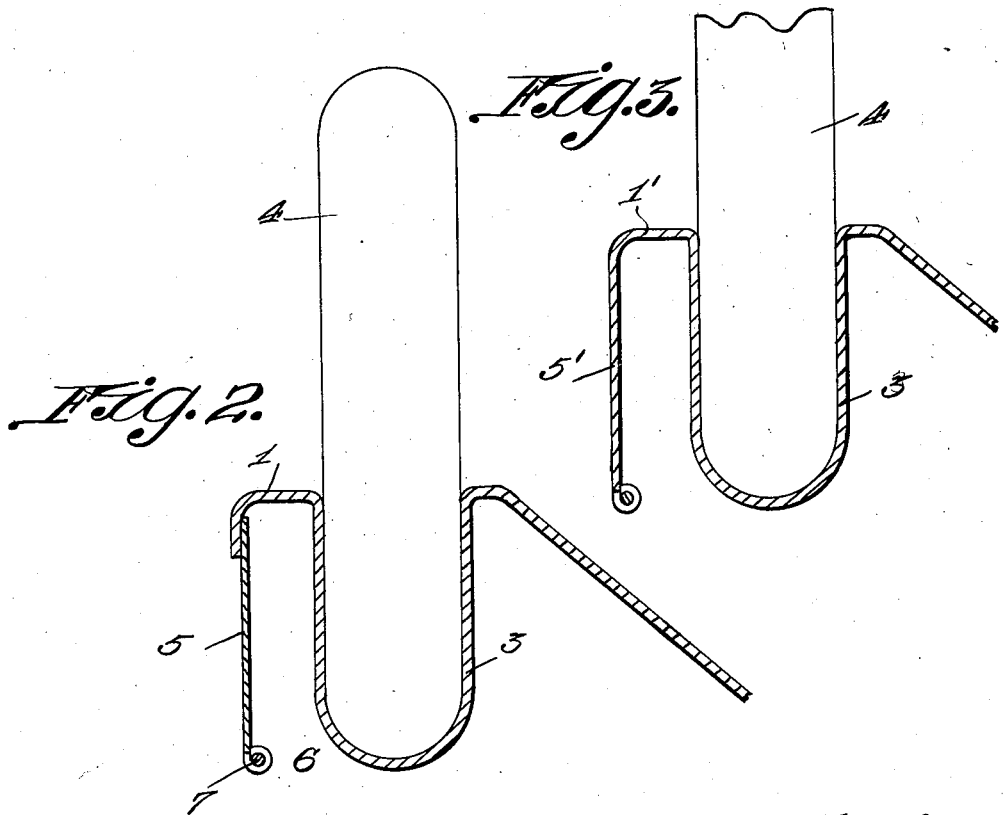
James W. Outterside, INVENTOR
BY Victor J. Evans, ATTORNEY Patented Aug. 4, 1931

1,817,705

UNITED STATES PATENT OFFICE

JAMES W. OUTTERSIDE, OF DETROIT, MICHIGAN

ATTACHMENT FOR AUTO FENDERS

Application filed August 23, 1929. Serial No. 387,992.

A number of automobiles have their front mud guards or fenders formed with depressions in the nature of pockets or wells for the reception of a spare wheel.

These wells are arranged directly to the rear of the front or steering wheels of the automobile, and the turning of these wheels forces the road dust and dirt against the wells so that the same present an unsightly appearance. It is the object of this invention to provide the fenders of an automobile equipped with wells with an apron either integrally formed with or welded to the outer edge of the fender disposed directly opposite to the well so that dirt and grime accumulated upon the outer face of the well will be concealed and the car will present a sightly appearance.

To the attainment of the foregoing the invention consists in the improvement hereinafter described and definitely claimed.

In the drawings:

Figure 1 is a side elevation of the front portion of an automobile equipped with the improvement.

Figure 2 is a sectional view approximately on the line 2—2 of Figure 1.

Figure 3 is a substantially similar sectional view but showing the apron integrally formed with the fender.

In the drawings the numeral 1 designates the front fender of an automobile 2. This fender is formed with a circular depression in the nature of a well 3 for the reception of the spare wheel 4 of the automobile 2.

In carrying out my invention I weld or otherwise fixedly secure to the inner face of the depending flange on the outer edge of the fender 1, directly opposite the well 3 a plate in the nature of an apron 5. Preferably the apron is formed to correspond with the outer contour of the well 3. The apron has its lower edge rolled to provide the same with a bead 6 and in this bead there is received a reinforcing wire 7.

In Figure 3 the apron 5' is integrally formed on the outer edge of the fender 1'.

My improvement, while of an extremely simple nature will conceal all of the dirt and grime which naturally accumulates upon the outer face of the well 3 incident to the travel of the automobile 2 and obviously should dust accumulate upon the outer face of the apron the same can be readily removed.

It should be stated that with my improvement the employment of the apron insures the cleaning of the well bottom as well as the bottom of the fenders.

As the apron fully covers the well, its lower edge naturally projects a slight distance below the outer wall of the well. It will be noted by reference to the drawings that the bead 6 on the outer or lower edge of the apron is directed toward the inner face of the said opening. The bead, therefore, will serve as a shed for directing dirt that contacts with the apron inwardly and downwardly in a direction toward the body of the well and the body of the automobile and at the same time the bead would serve as a stop element for mud or like accumulation to prevent the same marring the outer edge of the apron and likewise permitting such accumulations being easily and quickly removed.

Having described the invention, I claim:—

A fender for an automobile having a well for the reception of a spare wheel, and an apron welded or formed with the upper and outer edge of the well, spaced and depending from, extending slightly below and concealing the well and said fender, being shaped to correspond with the outer contour of the well and having its lower edge formed with an inwardly directed bead and a reinforcing wire in such bead.

In testimony whereof I affix my signature.

JAMES W. OUTTERSIDE.